3,716,077
FLEXIBLE DUCT CONNECTION
James Webster Sherman and Terry Allen Jenkins, Toledo, Ohio, assignors to Johns-Manville Corporation, New York, N.Y.
Filed Sept. 21, 1970, Ser. No. 73,754
Int. Cl. F16l 11/10, 21/00
U.S. Cl. 138—134       3 Claims

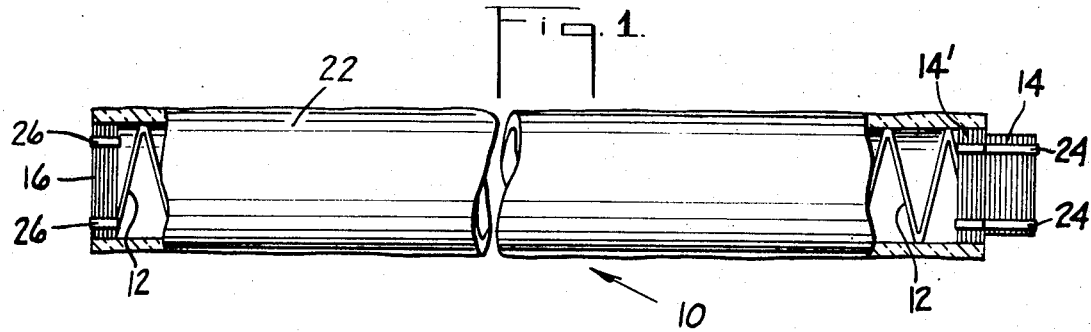
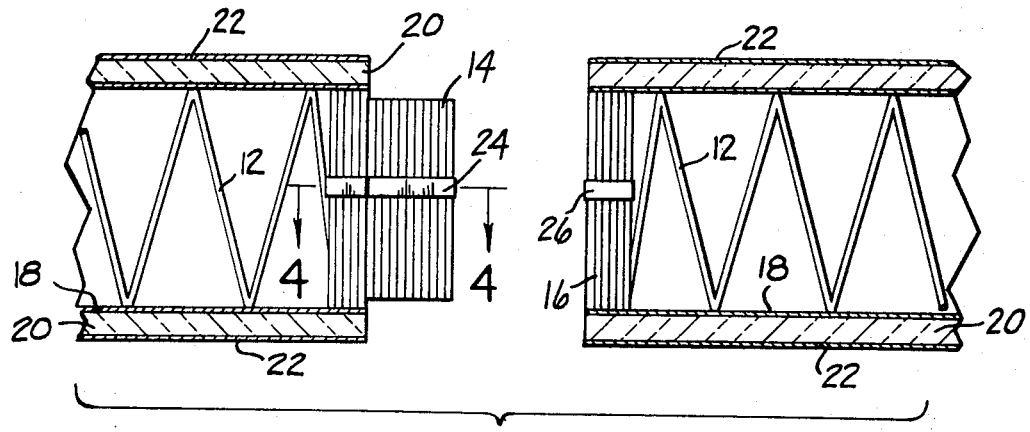
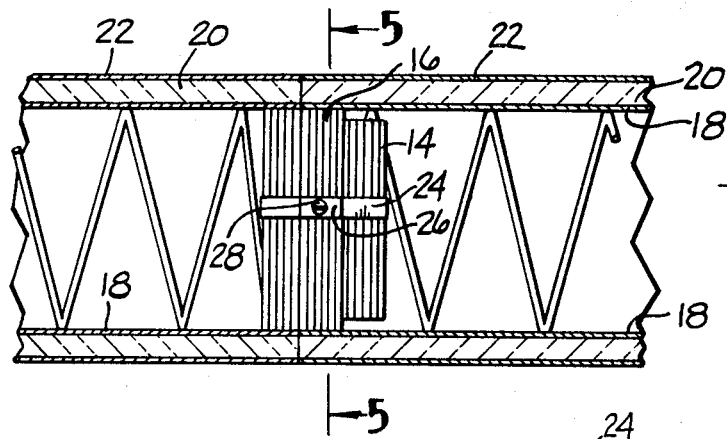
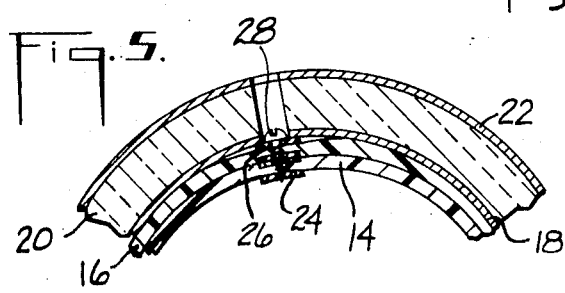
INVENTORS,
JAMES WEBSTER SHERMAN,
TERRY ALLEN JENKINS
BY
*John A. McKinney*
ATTORNEY United States Patent Office 3,716,077
Patented Feb. 13, 1973

ABSTRACT OF THE DISCLOSURE

A flexible insulated air duct formed by wrapping blanket insulation about a helically wound wire-like elongate tubular skeleton wherein the opposite ends of the helical windings are closed wound and secured together to form rigid collars of different diameters to define male and female connections whereby sections of such duct may be axially connected one to another.

BACKGROUND OF THE INVENTION

This invention relates to flexible air duct and particularly to structure providing for connection of one section of such duct with another. It is old in the art to provide a duct formed of fiber glass board having a relatively high binder content for maintaining rigidity. This type of duct can be provided with a liner which serves as a vapor barrier and to reduce friction loss of air passing therethrough. Another form of air duct is provided wherein fiber glass or similar blanket material is wrapped around sheet metal duct. A still further form is to provide a blanket covering around a helically wound wire skeleton.

In each of the above arrangements, some means must be provided for connecting the sections in axial communication. In some instances this has been accomplished by mechanically connecting the ends such as by applying tape around the joint. In other instances a sleeve is inserted into the end of each duct section to aid in forming the joint. By the prior art it is known that sections of sheet metal pipe, such as stove pipe, may be provided in the opposite ends of the duct sections for connecting one section with another.

These and other mechanical connections are costly in construction and often awkward in assembly. It is to a duct section having improved end connecting structure that this invention is directed.

BRIEF SUMMARY OF THE INVENTION

An object of this invention is to provide an inexpensive yet effective arrangement for connecting two sections of flexible air duct.

It is another object of this invention to provide ends of a helically wound skeleton in closed formation secured together in a manner to define male and female connections.

It is a further object of this invention to provide end connections which may be easily secured one to another.

BRIEF DESCRIPTION OF THE DRAWINGS

The invention will be more fully understood and further objects and advantages thereof will become apparent when reference is made to the following detailed description of the preferred embodiment of the invention and the accompanying drawing in which:

FIG. 1 is a side view of a section of flexible duct partially cut away at the ends to show the connecting structure;

FIG. 2 is a cross-sectional view through the ends of two sections of duct to be assembled;

FIG. 3 is a cross-sectional view of two sections of duct after assembly;

FIG. 4 is a cross-sectional view of a male connector taken along line 4—4 of FIG. 2;

FIG. 5 is a partial cross-sectional view taken along line 5—5 of FIG. 3.

DESCRIPTION OF THE PREFERRED EMBODIMENT

The invention herein relates to a section of flexible air duct having end connections which amount to an improvement over that disclosed in application Ser. No. 831,175, filed June 6, 1969, entitled "Flexible Conduit" and having a common assignee with this application.

A section of air duct (normally made in 6 to 8 ft. lengths) is designated generally by the numeral 10 in FIG. 1. The duct is comprised of a helically wound cylindrical skeleton 12 of wire or fiber glass roving covered by a thermal blanket. The helical formations throughout the length of the duct are normally spaced apart to have an axial lead but adjacent or closed wound at ends 14 and 16 to define rigid collars for permitting one section of duct to be connected with another in end-to-end relationship. Since these end connections form an important part of this invention, they will be more fully discussed later in the specification.

Skeleton 12 is first wrapped with a flexible sheet of fiber glass scrim cloth 18 to form an envelope therearound. Preferably the outer surface of the helical skeleton (including the ends) has an adhesive applied thereto for securing the cloth thereto. Thermal insulation 20 (preferably about ¾ inch thick fiber glass blanket) is wrapped around glass cloth 18 which surrounds skeleton 12. A portion of the last turn of the blanket may have adhesive applied thereto for securing it in position. While the indication herein is that fiber glass in blanket form is wrapped around the scrim surrounding the skeleton, it will be appreciated that glass fibers can be applied by other known methods. A vapor barrier in the form of a gas impervious envelope 22 surrounds insulating blanket 20. This envelope is preferably a fire retardant vinyl sheet placed around the fiber glass blanket 20 prior to the release of the tensile forces imposed in winding the blanket so that upon release of those forces an expansion of the blanket radially outward embraces the envelope. The vapor barrier may be a type of material which is subject to being heat shrunk around the outer surface of the insulating blanket. Regardless of the material or process used, the objective is to provide a vapor barrier envelope around the outside of the blanket material.

As previously indicated, helical windings 12 are axially spaced apart in lead generally throughout the body portion thereby defining a flexible skeleton. The helical windings at the ends 14 and 16, however, are closed wound and secured together to define generally inflexible collars. Closed winding is defined by one turn of the helix being laid in substantial abutment with the last to form a solid cylindrical section, whereas adjacent winding is defined as closed or slightly spaced. These windings may be secured one to another by the use of adhesive or a plurality of thin metal clips 24, 26 located at 120° intervals about the periphery thereof. It may be desirable to use a combination of the adhesive and clips. While it is deemed preferable from a manufacturing standpoint to form the end portions of the helical windings unitarily with the helical windings of the mid-section, it will be evident that the end sections may be formed separately and secured thereto.

One end 16 of the duct is formed to a diameter the same as the helical windings 12 throughout the section. This defines the female connector 16 shown in FIG. 2. The other end 14, as shown also in FIG. 2, defines the male connector. It is comprised of helical windings having an outer extremity of reduced diameter which is adapted to be axially received internally of connector 16 for establishing a connection between two sections of duct. The windings forming the extremity of end 14 define a cylindrical section which is somewhat longer than the cylindrical section defined by the closed winding 16 on the mating end and extends beyond the covered portion of the skeleton. FIG. 3 shows two pieces of duct disposed in connected relationship wherein the smaller diameter portion 14 is axially received within portion 16 of the other. It will be noted in this figure that metal clips or bands 24 and 26 which help retain the windings are aligned so that one falls over the other for receiving screw 28 therethrough. The suggested method of connecting the sections of duct is to drill holes through the vapor barrier 22, insulating blanket 20, scrim 18, metal bands 24, 26 and ends 14, 16 and insert self-tapping screws. It will be noted in FIG. 3 that portion 14 extends axially beyond portion 16 when the sections are assembled. It has been found from installation experience that this is a desirable arrangement because the connection can be temporarily established by slipping one end within another and then inserting the screws as a later step in assembly.

FIG. 4, which is a cross-sectional ivew taken along line 4—4 of FIG. 2, shows a wall section of the closed wound winding with a thin metal band or clip 24 disposed therearound. A stronger joint between duct sections is obtained if, upon assembly, band 24 of end 14 underlies band 26 of end 16 and the screw inserted through both. FIG. 5 is a partial cross-sectional view taken generally along line 5—5 of FIG. 3. It shows the ends in assembled relation with screws extending through both ends and their clips.

The smaller diameter portion 14 of one end may be formed unitary with the larger portion by holding the latter and winding the extremity to a smaller diameter and securing it in position, or they may be formed independently and mechanically secured thereto.

Where lengths of flexible tubing formed according to this disclosure are joined to other sections, envelopes 22 will substantially abut, and a sealed joint therebetween can be established by use of pressure sensitive tape to cover the seam and the holes left by the screws.

While one form of our invention has been disclosed it will be evident that various modifications may be made therein without departing from the spirit of the invention. The invention is defined by the claims herein.

We claim:

1. In a flexible air duct section comprising an elongate, helical, tubular skeleton and a gas impervious envelope superimposed on the skeleton, the improvement comprising successive helical windings of a mid-section of the tubular skeleton being spaced apart throughout a longitudinal extent of the tubular skeleton intermediate first and second rigid end sections of the skeleton to permit flexing of the duct section in the mid-section, successive helical windings in the rigid end sections of the tubular skeleton abutting and being secured together by clip means which is adapted to receive fasteners, the first end section being a male connector which projects beyond the envelope and the second end section being a female connector with the female connector having an internal diameter substantially the same as the external diameter of the male connector so that the male connector can be slipped into a female connector of an adjacent duct section.

2. The flexible air duct section as defined in claim 1 wherein the skeleton comprises helically wound strands of fibrous material.

3. The flexible duct section as defined in claim 1 wherein a layer of insulating material is located between the envelope and the tubular skeleton.

References Cited

UNITED STATES PATENTS

| | | | |
|---|---|---|---|
| 3,583,732 | 6/1971 | Dennis et al. | 138—129 X |
| 3,308,743 | 3/1967 | Waeldner et al. | 138—109 X |
| 2,580,872 | 1/1952 | Wise | 138—131 X |
| 2,093,810 | 9/1937 | Karmazin | 85—32 CS |
| 3,568,722 | 3/1971 | Runshe et al. | 138—109 X |
| 3,135,297 | 6/1964 | Nordberg et al. | 138—144 |
| 809,880 | 1/1906 | Wolldridge et al. | 85—32 CS |
| 3,527,258 | 9/1970 | Farr | 138—109 X |

WILLIAM E. WAYNER, Primary Examiner

U.S. Cl. X.R.

138—120, 155, 109; 285—399